Aug. 30, 1960

R. A. MAGNUSON 2,950,765

BALANCED LIFT VERTICAL AXIS PROPELLERS

Filed Dec. 27, 1956

INVENTOR.
Roland A. Magnuson
BY
Attorney

Aug. 30, 1960   R. A. MAGNUSON   2,950,765
BALANCED LIFT VERTICAL AXIS PROPELLERS
Filed Dec. 27, 1956   3 Sheets-Sheet 2
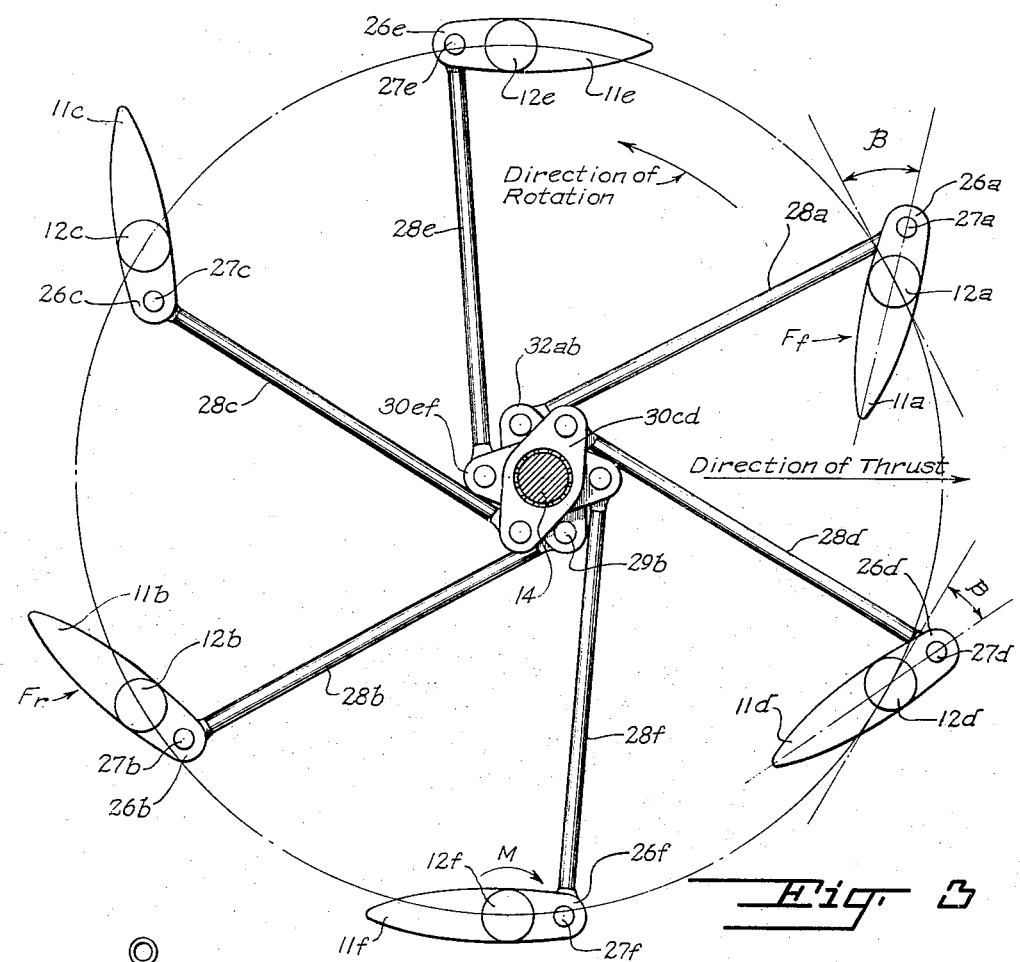
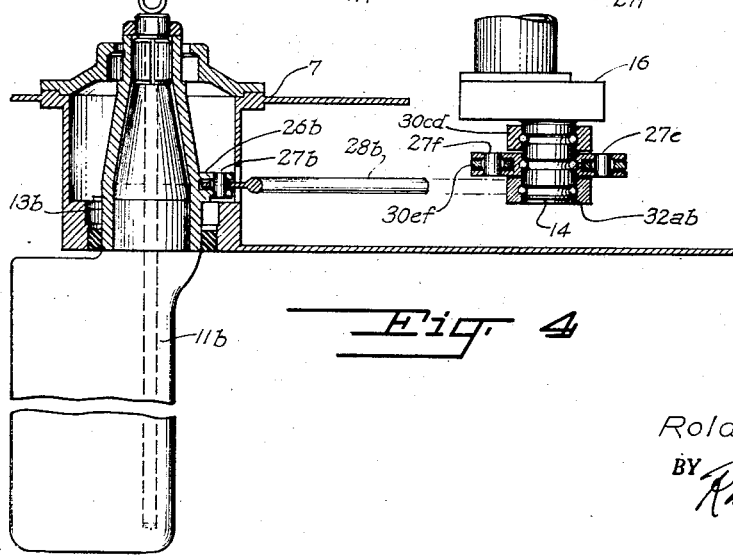
INVENTOR.
Roland A. Magnuson
BY
Attorney

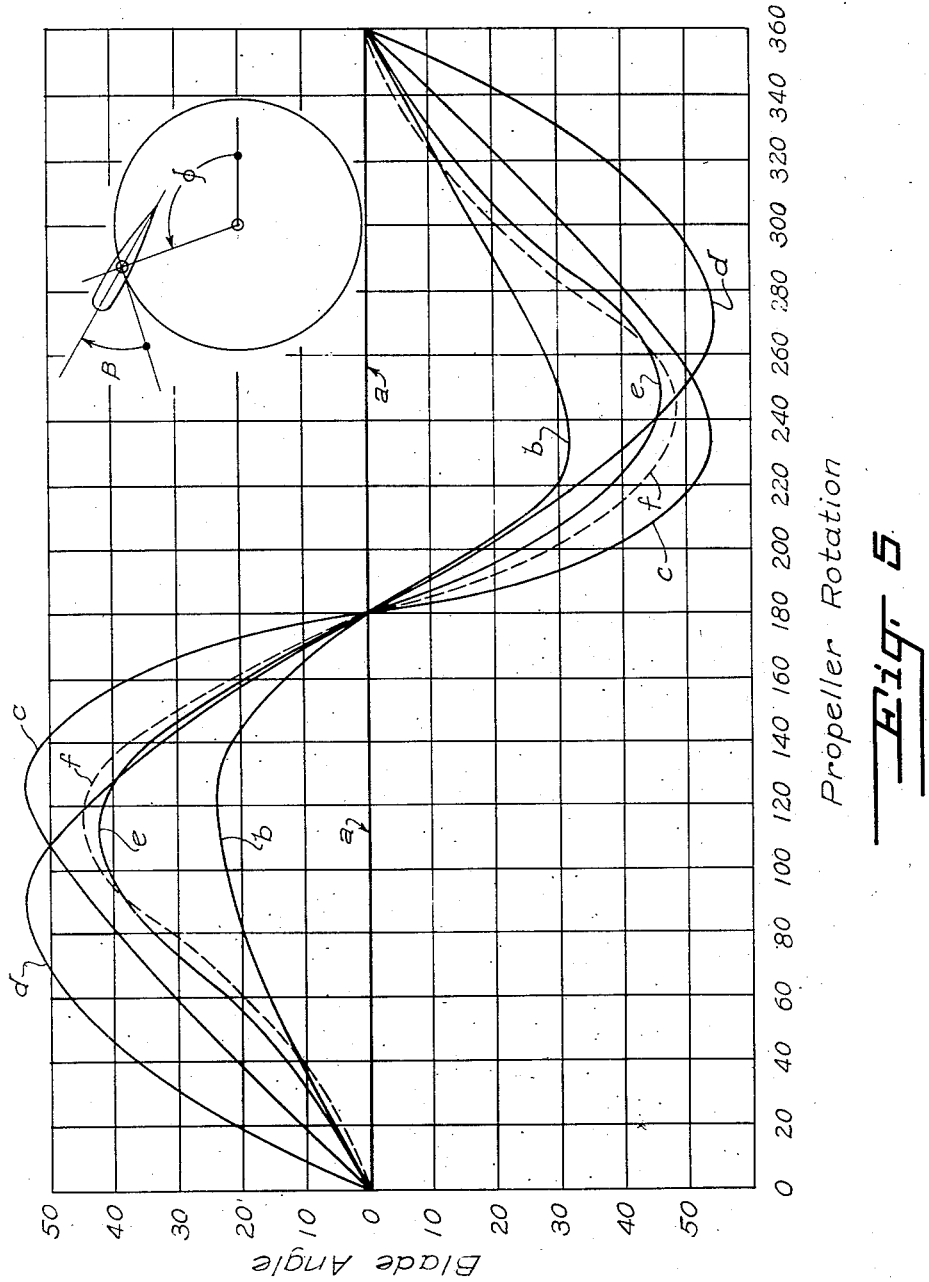

United States Patent Office 2,950,765
Patented Aug. 30, 1960

2,950,765

BALANCED LIFT VERTICAL AXIS PROPELLERS

Roland A. Magnuson, Seattle, Wash., assignor to Pacific Car and Foundry Company, Renton, Wash.

Filed Dec. 27, 1956, Ser. No. 630,782

7 Claims. (Cl. 170—151)

My invention relates to an improvement in the pitch control linkage for a cycloidal propeller, whereby opposite blades are coupled together in pairs to provide differential pitch self-regulation such that in equilibrium the hydrodynamic lift on the opposite blades remains equal and balanced. The inertial forces effect further perturbation of the equilibrium pitch relationship so as to render the blade motion more nearly ideal.

Cycloidal propellers produce a resultant driving thrust which may be set to act in any direction normal to an axis of rotation. The thrust producing surfaces are in general disposed parallel to, and in a radially symmetric array about, the axis of rotation. If viewed in the plane of rotation during forward motion the blades would be seen to trace a cycloidal path. In their use for marine propulsion in surface ships, these propellers are usually installed with the axis of rotation projecting through the hull in a direction generally perpendicular to a plane defined by the water line. For this reason they have been also referred to as "vertical axis propellers." By the conditions suggesting either designation, these propellers are readily distinguished from the more conventional screw type propellers in which the motion of the thrust producing surfaces describes a helical path and in the usual application to marine propulsion the axis of rotation is more nearly parallel to the plane of the water line, or horizontal.

When the conventional structure is viewed from the exterior of a hull, the base of the cycloidal propeller will appear as a flat circular disk set flush with the bottom of the hull. Projecting normal to the surface of the base, several generally rectangular, planar propelling blades are appended in a symmetrical array about the periphery of the disk. Each blade is provided with a separate axis of rotation so that it may be made to execute rotationally coordinated excursions from the position of tangency with the disk periphery. These excursions are adjustable in phase (direction) and in magnitude (pitch) so that during passage across the slipstream each blade can maintain an angle of attack with respect to the moving fluid effecting a thrust resultant in the direction of the slipstream.

The principal advantages inherent in the use of the cycloidal propeller stem from the fact that full thrust is available in any direction normal to the axis of rotation; not as in a screw propeller only parallel to that axis. The resulting improvement in maneuverability and ease of control in tug or tow boat service has been clearly demonstrated in actual installations of cycloidal propellers. In addition to its more effective steering force, the cycloidal propeller operates at full efficiency in producing lateral thrust for maneuvering the ship thus eliminating the loss of power consequent of conventional rudder action.

Although the advantages of the cycloidal propeller have been clearly demonstrated, a factor deterrent to general application is the increased complexity of the cycloidal blade cycling mechanism. In general it has been found that the greatest efficiency from a cycloidal propeller is obtained by generating an "amplified" cycloidal motion of blade excursion. Mechanisms for pitch control producing this motion have in general been rather complex and somewhat vulnerable to damage resulting from impact of the propeller blades with underwater obstructions. A sinusoidal motion can be generated with a mechanism of extreme simplicity and ruggedness; however, for sinusoidal motion the propulsive efficiency is inferior to that for amplified cycloidal motion or to that for a screw propeller without rudder action. It is a principal object of the present invention to obtain the efficiency comparable to that of the "amplified cycloidal" propeller with a mechanism having the simplicity and ruggedness of the sinusoidal linkage.

Briefly outlined, the sinusoidal linkage for effecting the pitch excursions of impeller blades consists of a crank arm attached to the axis of rotation of each blade linked to a connecting rod extending toward the center of the main disk to a central pivot. When the central pivot lies at the geometric center of the main driving disk, each blade remains tangent to the periphery of the disk and no propulsive force is exerted by the blades. When the central pivot is displaced away from center in a given direction, the blades passing forward of this direction are pivoted so as to increase the angle of attack, and thus exert a forward pull, while the rearward blades execute a decreased angle of attack of equal magnitude and thereby exert a push on the system in the forward direction. The sinusoidal angular excursion of each blade in its traverse forward of the center of rotation becomes similar to that for the rearward half of the rotation. However, equal blade angle does not produce the most effective thrust from the rearward impellers because the relative velocity of the fluid across the rearward path is increased by the reaction of the forward blades in producing a slipstream. It would thus be desirable to increase the pitch deviation in the rearward path with respect to that in the forward path so as to equalize the thrust produced by each blade. The present invention effects this equalization by providing equalizing crank arms pivoted freely about the central pivot, each arm linking the connecting rods from two opposite blades. In this way, while the sum of the pitch deviation of each blade is still fixed by the displacement of the control pivot and the relative position of the blades in the orbit, the pitch of one blade is free to increase as the other decreases until, in equilibrium, equal radial thrust is obtained from each blade. The inertia of the blade and linkage system acts to modify the pitch variation allowed by the equalizing linkage in a way which renders the blade motion more nearly ideal and thus more efficient.

It may be anticipated from the foregoing outline that numerous and substantial advantages will result from the practice of the present invention. As already pointed out the present invention provides for a more efficient blade motion with a greatly simplified linkage system.

Another object of the invention is the increase in capacity of a propeller of given size by automatically adjusting the pitch of opposite pairs of blades to compensate for the difference between the slipstream velocities in the front and rear portions of blade orbit.

A further object of the invention is the improvement of overall efficiency by permitting the blades to feather in the sectors of blade orbit normal to the direction of thrust where lift of the blades contribute little to the effective thrust.

Still another object of the invention is the reduction in vulnerability to blade damage as a result of impact with submerged objects because of the rotational flexibility of each blade.

Should collision with an underwater object result in the loss of one blade of a set, it is another object of the invention to allow feathering of the remaining blade so as to reduce the force unbalance resulting therefrom.

These and other objects attained by practice of the teaching of my invention will become apparent in the following description in conjunction with the drawings in which:

Fig. 3 shows a plan view of the linkage elements of a cycloidal propeller having three pairs of blades;

Figure 1:
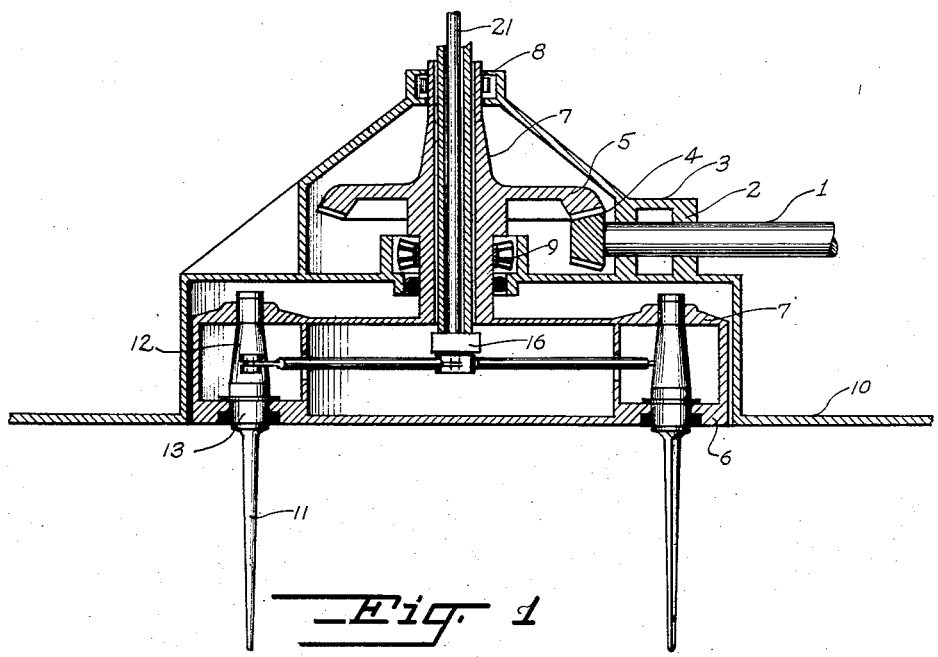
Fig. 1 shows a sectional elevation showing the essential components of a complete propeller.

Fig. 4 shows a view in elevation of the one blade of the array depicted in Fig. 1, showing in sectional view the structural details of the control pivot and blade pivot; and Fig. 5 is a graph showing the blade angle as a function angular orientation as defined in Fig. 1—(a) for zero lift no forward velocity, (b) for zero lift in slipstream with forward velocity, (c) for amplified cycloidal motion, (d) for sinusoidal motion, (e) for balanced lift and (f) for balanced lift with inertial lag.

Referring now to the drawings in which corresponding components are designated by identical reference characters throughout the several views, the propulsive power from the ship's engine or other source is applied to rotate input shaft 1 (Fig. 1) which is supported in bearings 2 mounted as a fixed part of housing 3. Attached to an extremity of shaft 1 pinion gear 4 is engaged to drive beveled ring gear 5 at a reduced rotational speed, with axis of rotation at right angles to that of the input shaft 1. The ring gear 5 is attached as an integral part of the housing assembly generally referred to as the rotor 6 which comprises a vertical shaft member 7 which transmits the driving torque from the ring gear 5 to a concentric cylindrical disk 7 extending radially therefrom. Supplying the reactive forces necessary to obtain torque from the tangential thrust on ring gear 5, shaft bearing 8 and main bearing 9 serve to center the rotor 6 with respect to the housing 3; these bearings, and particularly main bearing 9, serve in addition to absorb the driving thrust produced by the reaction of the blades on the water, or other fluid medium. The rotor bearings 8 and 9 and input shaft bearing 2 are all in fixed position relative to the main part of the ship hull 10, being supported by the essentially rigid structure of housing 3. The rotor 6, constrained to execute rotational motion with respect to the hull 10, carries the propelling blades 11 pivotally mounted by extension shafts 12 in bearings 13 which are disposed in pairs about the periphery of rotor 6 in radially opposite positions.

Figure 2:
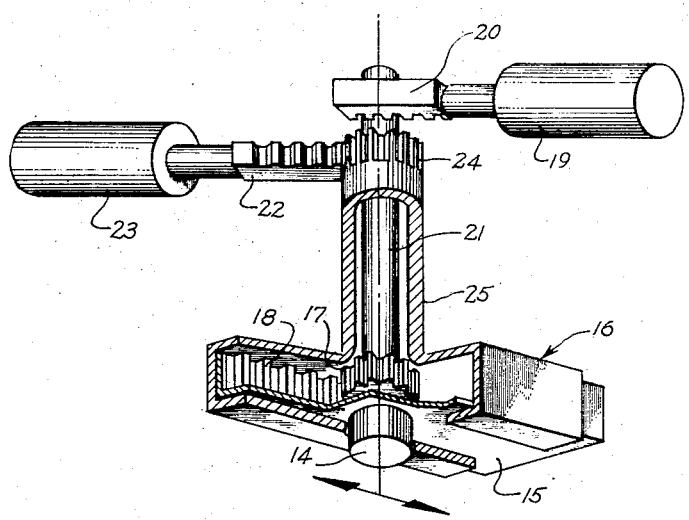
Fig. 2 shows a mechanism for positioning the eccentric plate.

The angular excursions which the blades of a cycloidal propeller must execute during each revolution of rotor 6 are in general controlled by the offset of an eccentric pin 14 with respect to the axis of rotation of the rotor 6. In general the average magnitude of these excursions will bear a direct relationship to the degree of eccentricity. With the present linkage the net thrust of the blades on the hull will act in the direction in which the pin 14 is displaced from the center of rotor 6. One system for controlling the magnitude and direction of eccentricity of the pin 14 is shown in Fig. 2 in greater detail than is possible in Fig. 1. The eccentric pin 14 is mounted so as to extend perpendicularly to the lower surface of the sliding plate 15. Plate 15 in turn is constrained to slide in a direction parallel to the side walls of housing box 16, which define a guiding surface for the close fitting longitudinal edges of plate 15. The positioning of plate 15 with respect to housing 16, determining thereby the magnitude of eccentricity, is controlled by the action of pitch control gear 17 acting on rack 18 which is disposed parallel to the guiding surfaces of box 16. Rotation of gear 17 may be effected by external means such as a pitch control servo cylinder 19, driving rack 20 so as to effect rotation of pitch control shaft 21 and corresponding displacement of eccentric pin 14. So that the rotation of box 16 and rack 18 (for direction control) with respect to pitch control gear 17 will not vary the pitch, servo cylinder 19 may be constrained to rotate as a whole in synchronism with box 16.

The direction of the pin displacement, serving as a steering control on the ship by its effect on the thrust direction, is effected by the action of servo cylinder to control the lateral position of rack 22 which is enmeshed with gear 24. Connection between guide box 16 and gear 24 is by means of hollow shaft 25 interposed radially inside of rotor shaft 7 and outside of pitch control shaft 21, all three shafts being concentrically disposed. The steering-servo-cylinder 23 is fixed with respect to the hull of the ship 10 and housing 3.

In the foregoing, means were described for driving the main rotor and blades and for positioning the eccentric pin; and with this means there is provided a special linkage connecting the eccentric pin 14 with the blades on shafts 12. Referring to Fig. 3 the eccentric pin 14 and blade shafts 12 are shown in relative positions established by structure already described. As an example of a practical propeller three pairs of two blades are shown; similar components associated with the six blades have been given the same numerical reference characters, but are distinguished by a letter suffix common to all components of each blade. Considering by way of illustration, one of the pairs consisting of blade shafts $12^a$ and $12^b$; crank arm $26^a$ is attached to shaft $12^a$ extending forward of the hydrodynamic leading edge of blade $11^a$. Connecting rod $28^a$ is attached at its outer end to a pin $27^a$ in the crank arm $26^a$, and toward the center of the rotor 6, to pin $29^a$. An equalizing arm $30^{ab}$ is provided with bearing means $32^{ab}$ so as to freely rotate about eccentric pin 14. Of the pin linkages in opposite arms of the equalizing arms $30^{ab}$, $29^a$ connects the inward terminal of rod $28^a$ while $29^b$ connects rod $28^b$. On the blade linkage paired with blade $11^a$; connecting rod $28^b$, pin $27^b$, crank arm $26^b$, pin $12^b$ and blade $11^b$ bear identical connections, one with the other as already described for blade $11^a$. The two other pairs of blades shown in Fig. 3 are identically connected. The necessary vertical clearance between the linkage mechanisms for each pair is provided by an appropriate vertical displacement of the plane of action of the linkages as shown in the elevation of Fig. 4 in which the uppermost linkage connects blades $11^c$ and $11^d$, the middle linkage connects blades $11^e$ and $11^f$, while the lowermost linkage connects blades $11^a$ and $11^b$.

In order to appreciate the advantages accruing from the use of the aforedescribed linkage, one must be mindful of the characteristics of blade motion required to obtain optimum performance and efficiency of the cycloidal propeller. Curves showing typical blade excursions β as a function of propeller rotation are plotted in Fig. 5 where the angular position of a blade in its orbit on the rotor correspond to the angles designated in the plan view of the propeller (Fig. 3). When the propeller is stationary and no thrust is desired, a central position of the pin 14 will cause the axis of each blade to feather in a direction tangent to the arc described by the motion of pins 12. The blade motion will be represented then by zero blade angle axis curve (a) of Fig. 5. If the propeller is moving through the fluid in the 90° direction and no thrust is desired, the blades must execute an angular excursion shown in curve (b). For purposes of comparison with the lift curves under power, the zero lift curve is that for a blade operating in the slipstream which the propeller generates when it is producing lift. Thus the blade angles in the aftwise arc from 180° to 360° are of necessity larger than those in the forward arc where the blades act on an undisturbed fluid. During the travel from 90° to 270° the blade has an orbital velocity component parallel to that of the fluid, thus reducing the relative velocity between the two. To produce zero lift in this range requires a pitch angle greater than that in the corresponding positions in the forward arc of the blades. Thus the zero lift curve has its maximum and minimum shifted toward the midpoint (180°) of blade motion with the fluid.

The zero lift curve represents a true cycloidal motion. If one assumes a slip free flow pattern, then a true cycloidal pattern of blade motion should give optimum efficiency. In actual practice, however, where the after blades must operate in the slipstream produced by the forward blades, an "amplified" cycloidal pattern has been found more effective. This pattern is obtained from the zero lift cycloidal pattern by simply increasing the values of the ordinates B by a constant factor (generally not exceeding 1.4) as shown in curve $c$ of Fig. 5. The amplified cycloidal motion for a given maximum pitch angle has a maximum somewhat closer to 90° than does the true cycloidal motion and thus becomes more similar to sinusoidal blade motion shown in curve $d$.

The effects produced by the coupling linkage can be appreciated by referring again to Fig. 3 where the resultant lift force-vector is indicated as $F_f$ for the forward blade $11^a$ and as $F_r$ for the paired rearward blade $11^b$. Both vectors produce a moment with respect to the blade axis 12, the forward blade tending to rotate in a counterclockwise direction, the rearward blade in a clockwise direction. The symmetry of the equalizing linkage requires that compression in the connecting link $28^a$ from lift $F_f$ must be equal and opposite to the tension link $28^b$ from lift $F_r$. To reach this condition for the case in which $11^b$ travels in the increased fluid velocity of the slipstream, the pitch angle of blade $11^b$ must increase, that of blade $11^a$ must decrease. This is simultaneously accomplished by a counterclockwise angular perturbation of equalizing link $30^{ab}$ with respect to the moving rotor 6. The lift on each blade of a pair becomes balanced so that full effectiveness is obtained from both forward and rearward blades. In this way the power handling capacity of a propeller of given size is enhanced.

The pattern of blade motion for the balanced lift linkage is shown in Fig. 5 as curve $e$. Its maxima pitch values are displaced further from the 180° position than are maxima for amplified cycloidal motion. However, in the derivation of curve $e$, the inertia of the blades and linkages has been neglected. By the arrangement of the present invention, this inertia will shift the pitch angle pattern so as to more closely approach that for amplified cycloidal motion. The present blades and linkage components are balanced so as to produce no net torque as a result of rotation of each combination of blade 11, arm 27 and connecting rod 28 about the axis of disk 6. Thus each blade is free from disturbing torques produced by the general rotation of disk 6. However, in the rotation of each blade about its own axis 12, the inertia of these parts must be considered. For example, consider the position shown in Fig. 3 for blades $11^a$ and $11^b$ where blade $11^a$ is being rotated counterclockwise to zero pitch angle at 180° while blade $11^b$ is being rotated clockwise. The inertial forces incident to this rotation will tend to rotate equalizing crank $30^{ab}$ clockwise thus increasing the pitch on $11^a$ and decreasing that on $11^b$. While theoretical computation of the exact perturbation effected by these inertial forces as balanced by the hydrodynamic forces on the blades is not possible, an estimate of the shift of curve $e$ using approximate methods has been accomplished; the results are shown as curve $f$ of Fig. 5. It is clear that the inertial lag shifts the blade angle relationship into a more desirable pattern with respect to the amplified cycloidal pattern.

The additional degree of freedom afforded by the proposed linkage provides two advantages of practical importance in operation of a ship propelled by a cycloidal propeller of the present design. If an obstruction is met by one of the blades, the ability of the blade to execute free rotation over a certain latitude, can serve to reduce the loading from impact sufficiently to avoid damage to the blade and linkage. Should a blade be lost, however, the property of the equalizing linkage requiring equal lift, will cause the remaining blade of the pair to feather to the angles of zero lift (curve $b$ of Fig. 5) so that the propeller will remain balanced with respect to hydrodynamic forces.

What I claim is:

1. In a cycloidal propeller assembly, a blade carrying power driven rotor disk, a primary bearing means constraining said rotor disk to rotation about an axis perpendicular to the center of said disk, a secondary bearing means having an axis of rotation parallel to that of the rotor disk, means for displacing said second bearing means in any direction radial of the axis of the rotor disk, a cross arm pivotally mounted on said second bearing means having end pivots at diametrically opposite extremities and movable on said second bearing free of said rotor disk, a pair of impeller blades, bearing means constraining each impeller blade to rotation about axes generally parallel to that of the rotor disk, said bearing means being mounted on and projecting from diametrically opposite positions near the periphery of the rotor disk, a crank arm connected to each impeller blade extending forward of its axis of rotation and having a pivot in its outer extremity, a pair of links pivotally connecting and fixing the distance between the outer pivot of each crank arm and one end pivot of said cross arm, said axial links being of such length that when primary and secondary axes of rotation are coincident, lines parallel to the blade chords of opposite blades are parallel with each other and parallel to a line intersecting the axes of the end pivots of the cross arm.

2. In a cycloidal propeller, means for providing differential pitch adjustment of two radially opposite impellers about axes normal to a rotor disk comprising, lever arms extending forward generally along the chord axis of the impeller from the axis of rotation of each blade, a central pivot, an equalizing lever freely rotatable about said central pivot and movable about said pivot free of said rotor disk, a first connecting rod fixing the distance between the one extremity of said equalizing lever and one of the extremities of one of said lever arms, a second connecting rod fixing the distance between the remaining extremity of said equalizing lever and the extremity of the remaining of said lever arms, said linkage effectively equalizing the torque produced by the action of hydrodynamic lift about the axis of blade rotation for each impeller.

3. A cycloidal propeller having a fixed pivot and a single axis of rotation, a base structure providing radial extension from the axis of said fixed pivot, driving means for rotating said base structure about the axis of said fixed pivot, a pair of orbital pivots with axes generally parallel to the axis of said fixed pivot attached to said base structure at positions radially symmetric thereof, a pair of impeller blades each rotatable about the axis of one of said pair of pivots and having center of hydrodynamic pressure aftward of the axis of its orbital pivot, a pair of crank arms each affixed to one of said impeller blades and extending forward of the axis of rotation thereof, a pair of connecting rods, each attached to the outer extremity of one of said pair of crank arms and extending generally inward toward the fixed pivot, a cross link connecting the inward extremities of said pair of connecting rods, a control pivot fixing the center of said cross link whereby said cross link may pivotally move with respect to said base structure, and means for positioning said control pivot either co-axial with the axis of said fixed pivot or at distances radial thereof.

4. The structure of claim 3 including two or more pairs of blades symmetrically arrayed on said rotor disk, each pair having a cross link pivotally mounted on said single control pivot.

5. A cycloidal propeller having a fixed pivot and a single axis of rotation, a base structure providing radial extension from the axis of said fixed pivot, driving means for rotating said base structure about the axis of said fixed pivot, a pair of orbital pivots with axes generally parallel to the axis of said fixed pivot and attached to said base structure at positions radially symmetric thereof, an impeller blade attached to each orbital pivot having a center of hydrodynamic pressure chordwise rearward of the axis of the orbital pivot, torque applying means affixed to each impeller blade, a control pivot generally centrally located in the base structure, equalizing linkage rotatable about the control pivot and free of said base structure connecting the control pivot to the torque applying means of each impeller blade whereby the distance between control pivot and the torque applying means is equalized and the torque applied to opposite interconnected torque applying means is equalized.

6. The structure of claim 5 including two or more pairs of blades symmetrically arrayed on said rotor disk, each pair having a cross link pivotally mounted on said single control pivot.

7. A cycloidal propeller having a fixed pivot and a single axis of rotation, a base structure providing radial extension from the axis of said fixed pivot, driving means for rotating said base structure about the axis of said fixed pivot, a pair of orbital pivots with axes generally parallel to the axis of said fixed pivot attached to said base structure at positions radially symmetric thereof, a pair of impeller blades each rotatable about the axis of one of said pair of pivots and having center of hydrodynamic pressure aftward of the axis of its orbital pivot, a pair of crank arms each affixed to one of said impeller blades, a pair of connecting rods, each attached to the outer extremity of one of said pair of crank arms and extending generally inward toward the fixed pivot, a cross link connecting the inward extremities of said pair of connecting rods, a control pivot fixing the center of said cross link and on which said cross link freely pivots whereby movement free of said base structure is imparted to said cross link, and means for positioning said control pivot either co-axial with the axis of said fixed pivot or at distances radial thereof.

References Cited in the file of this patent

UNITED STATES PATENTS

| | | |
|---|---|---|
| 2,015,514 | Ehrhart | Sept. 24, 1935 |
| 2,037,069 | Ehrhart | Apr. 14, 1936 |
| 2,291,062 | Schneider | July 28, 1942 |
| 2,753,066 | Franz | July 3, 1956 |

FOREIGN PATENTS

| | | |
|---|---|---|
| 885,487 | France | Sept. 16, 1943 |